US009425958B2

(12) United States Patent
Vennelakanti et al.

(10) Patent No.: US 9,425,958 B2
(45) Date of Patent: Aug. 23, 2016

(54) SYSTEM, METHOD AND APPARATUS FOR CRYPTOGRAPHY KEY MANAGEMENT FOR MOBILE DEVICES

(75) Inventors: Ravigopal Vennelakanti, Bangalore (IN); Savio Fernandes, Margao (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 896 days.

(21) Appl. No.: 11/996,588

(22) PCT Filed: Aug. 5, 2005

(86) PCT No.: PCT/IN2005/000257
§ 371 (c)(1),
(2), (4) Date: Jan. 24, 2008

(87) PCT Pub. No.: WO2007/017882
PCT Pub. Date: Feb. 15, 2007

(65) Prior Publication Data
US 2008/0209221 A1    Aug. 28, 2008

(51) Int. Cl.
*H04L 29/06* (2006.01)
*H04L 9/08* (2006.01)
(Continued)

(52) U.S. Cl.
CPC ............ *H04L 9/0894* (2013.01); *H04L 9/0891* (2013.01); *H04L 9/3226* (2013.01);
(Continued)

(58) Field of Classification Search
CPC ..... H04L 63/06; H04L 9/0894; H04L 9/3236; H04W 12/04
USPC .......... 380/277, 278, 286; 713/169, 171, 172, 713/182, 185; 726/6, 29
See application file for complete search history.

(56) References Cited

U.S. PATENT DOCUMENTS 5,719,941 A * 2/1998 Swift et al. .................... 713/155
6,044,155 A * 3/2000 Thomlinson et al. ......... 713/155
(Continued)

FOREIGN PATENT DOCUMENTS

EP    0752663 A1    1/1997
EP    0891055 A2    1/1999
(Continued)

OTHER PUBLICATIONS

Luo, Hui; Henry, Paul; "A Common Password Method for Protection of Multiple Accounts", 14th IEEE Proceedings on Personal, Indoor and Mobile Radio Communications, vol. 3, Sep. 7-10, 2003, pp. 2749-2754.*

(Continued)

*Primary Examiner* — Victor Lesniewski
(74) *Attorney, Agent, or Firm* — Hewlett Packard Enterprise Patent Department

(57) ABSTRACT

A technique that binds encryption and decryption keys using a UID, a UDID, and a Pswd to a client mobile device in an enterprise. In one example embodiment, this is achieved by creating a new user account using the UID and the DPswd in an inactive state and communicating the UID and the DPswd to an intended user using a secure communication medium by an administrator. The intended user then logs into a cryptography key management system using the UID and the DPswd via a client mobile device. The UDID associated with the client mobile device is then hashed to create a H(UDID). The H(UDID) is then sent to the cryptography key management system by a local key management application module. The H(UDID) is then authenticated by the cryptography key management system. An encryption/decryption key is then assigned for the client mobile device.

19 Claims, 5 Drawing Sheets

(51) Int. Cl.
*H04L 9/32* (2006.01)
*H04W 12/06* (2009.01)
*H04W 12/04* (2009.01)

(52) U.S. Cl.
CPC ............ *H04L9/3236* (2013.01); *H04L 9/3273* (2013.01); *H04L 63/06* (2013.01); *H04L 63/062* (2013.01); *H04L 63/083* (2013.01); *H04L 63/0846* (2013.01); *H04W 12/04* (2013.01); *H04W 12/06* (2013.01); *H04L 2209/80* (2013.01)

(56) References Cited

U.S. PATENT DOCUMENTS

| | | | |
|---|---|---|---|
| 6,052,468 | A | 4/2000 | Hillhouse et al. |
| 6,118,874 | A * | 9/2000 | Okamoto et al. ............ 380/282 |
| 6,370,649 | B1 * | 4/2002 | Angelo et al. ................ 726/18 |
| 6,611,913 | B1 * | 8/2003 | Carroll ................. H04L 9/0894 455/410 |
| 6,662,299 | B1 * | 12/2003 | Price, III ...................... 713/171 |
| 6,934,839 | B1 * | 8/2005 | Pagel .......................... 713/156 |
| 6,996,720 | B1 * | 2/2006 | DeMello et al. ............. 713/189 |
| 7,028,184 | B2 | 4/2006 | Hind et al. ................... 713/170 |
| 7,155,437 | B2 * | 12/2006 | Chang et al. |
| 7,222,236 | B1 * | 5/2007 | Pagel .......................... 713/176 |
| 7,266,699 | B2 * | 9/2007 | Newman et al. ............. 713/182 |
| 7,290,149 | B2 * | 10/2007 | Alabraba et al. ............ 713/189 |
| 7,350,076 | B1 * | 3/2008 | Young et al. ................ 713/169 |
| 7,591,012 | B2 * | 9/2009 | Jaganathan et al. ........... 726/14 |
| 7,681,033 | B2 * | 3/2010 | Miura et al. ................. 713/155 |
| 7,681,042 | B2 * | 3/2010 | Khulusi et al. .............. 713/185 |
| 2001/0005346 | A1 | 6/2001 | Sako et al. |
| 2002/0184515 | A1 * | 12/2002 | Oho et al. .................... 713/193 |
| 2003/0021417 | A1 | 1/2003 | Vasic et al. |
| 2003/0021418 | A1 * | 1/2003 | Arakawa et al. ............. 380/277 |
| 2003/0023847 | A1 * | 1/2003 | Ishibashi et al. ............. 713/169 |
| 2003/0046572 | A1 * | 3/2003 | Newman et al. ............. 713/193 |
| 2003/0123671 | A1 * | 7/2003 | He et al. ...................... 380/282 |
| 2003/0133576 | A1 * | 7/2003 | Grumiaux ..................... 380/279 |
| 2004/0083393 | A1 * | 4/2004 | Jordan et al. ................ 713/202 |
| 2005/0123131 | A1 * | 6/2005 | Naccache ............. H04L 9/0894 380/30 |
| 2005/0132357 | A1 * | 6/2005 | Shell et al. .................... 717/174 |
| 2005/0141718 | A1 * | 6/2005 | Yu et al. ....................... 380/277 |
| 2005/0228994 | A1 * | 10/2005 | Kasai et al. .................. 713/168 |
| 2005/0278542 | A1 * | 12/2005 | Pierson et al. ................ 713/182 |
| 2006/0048211 | A1 | 3/2006 | Pierson et al. |
| 2006/0075234 | A1 * | 4/2006 | You .......................... H04L 9/321 713/169 |
| 2006/0161502 | A1 * | 7/2006 | Cerruti et al. ..................... 705/71 |
| 2006/0242415 | A1 * | 10/2006 | Gaylor .................... G06F 21/31 713/176 |
| 2006/0282681 | A1 * | 12/2006 | Scheidt et al. ............... 713/186 |
| 2007/0014416 | A1 * | 1/2007 | Rivera et al. ................. 380/286 |
| 2008/0115199 | A1 * | 5/2008 | Young ................. H04L 63/0869 726/6 |
| 2008/0134347 | A1 * | 6/2008 | Goyal et al. .................... 726/29 |

FOREIGN PATENT DOCUMENTS

| | | |
|---|---|---|
| EP | 0977396 A2 | 2/2000 |
| EP | 1526677 A1 | 4/2005 |
| JP | 2005192110 A | 7/2005 |

OTHER PUBLICATIONS

European Office Action received in EP Application No. 05778411.8, mailed Jan. 4, 2013, 9 pages.
International Search Report & Written Opinion, PCT Patent Application No. PCT/IN2005/000257, May 8, 2006, 15 pages.
International Search Report & Written Opinion, PCT Patent Application No. PCT/IN2005/000260, Dec. 16, 2005, 16 pages.
International Search Report & Written Opinion, PCT Patent Application No. PCT/US2005/000259, Mar. 23, 2006, 11 pages.

* cited by examiner

SYSTEM, METHOD AND APPARATUS FOR CRYPTOGRAPHY KEY MANAGEMENT FOR MOBILE DEVICES

FIELD OF THE INVENTION

This invention relates to the field of cryptography mechanisms, and more specifically to a system, method and apparatus to maintain portable computer data security and key management for use therein.

BACKGROUND OF THE INVENTION

To ensure data security on devices for local storage, several pointed solutions are available that rely on proven encryption and decryption mechanisms. Standard security practices recommend that the keys used for encryption and decryption should not be stored along with the encrypted data. This is akin to locking a door with a strong lock and leaving the key under the doormat.

Also, a user may use multiple keys to encrypt different pieces of data. Managing these keys can become very difficult when the number of keys used to encrypt the different pieces of data significantly increases.

Furthermore, standard security practices require that the keys used for encryption and decryption should be changed periodically. In such a case, the data encrypted by previous keys should be recoverable and the integrity of data should still be maintainable. The keys required for decryption of data may get lost or corrupted. In which case there would be no way of recovering the encrypted data.

Organizations require that access to sensitive corporate data stored in encrypted format should be recoverable (decrypted) by authorized personnel other than the entity who may have encrypted the data. This requirement arises from the fact that an entity may leave the organization. In such a case the data encrypted by that entity should still be recoverable by authorized personnel such as an administration/organization or a government.

Conventional solutions for key escrow and distribution are largely targeted towards systems, such as desktops, servers, storage devices, and other such fixed machines, which are protected within the periphery of the corporate firewall. These systems generally have sufficient processing capabilities, power/energy resources and capabilities to comply with the corporate security policies. In addition, these systems are physically protected within the corporate periphery.

However, these conventional solutions are not adequate to address the security and integrity needs of mobile computing devices like laptops, personal digital assistants (PDAs), tablet computers and mobile media like flash cards. Mobile devices and media are exposed to security threats, which are not common to fixed systems. They do not lie within the periphery of the enterprise; hence it is difficult to mandate and audit them to adhere to corporate security and firewall policies.

In addition, portable computing devices and mobile media are vulnerable to theft, thereby increasing the likelihood of exposing sensitive files. Storing laptop data in a cryptographic file system does not fully address the problem. Such systems ask the user to imbue them with long-term authority for decryption, but that authority can be used by anyone who physically possesses the machine.

Furthermore, mobile devices have limited computing and battery power and hence solutions that rely on public keys may prove to be computationally expensive. Not all mobile devices support industry standard key-lengths, such as 128 bit and above for symmetric encryption and 512 bit and above for asymmetric key encryption.

One conventional technique uses a Public Key Infrastructure (PKI) based solution, which mostly depends on X.509 Digital Certificates, Certification Authority, CA and PKI. These solutions typically rely on asymmetric keys for mutual authentication, which can require large processing capabilities and mandate the requirement of a PKI. Therefore, these solutions can result in not being very cost effective. Moreover, the certificates used in PKI are not customized with extensions to accommodate the requirements of mobile devices, like unique device identifier, device capability credentials and so on.

Another conventional technique relies on using trusted escrow agents that require manual intervention. Such solutions are generally not feasible in an enterprise with a large number of mobile device deployments. Further, these solutions tend to be slow and non-adaptive.

The above techniques rely heavily on role based access control to restrict/allow access to corporate data. Such techniques have control over who is viewing the data, but they do not have any control over where the data is being accessed. For example, based on use and domain credential an authorized user can access enterprise data from a desktop, laptop or PDA. While this addresses convenience of data being accessed any time, anywhere, there are serious security threats to be concerned about when dealing with mobile devices. The security capabilities of mobile devices are generally inferior when compared with the security capabilities of fixed devices. In addition, current corporate security policies and firewalls do not provide adequate control over mobile devices.

SUMMARY OF THE INVENTION

According to an aspect of the present subject matter, there is provided a method for binding encryption and decryption keys using a unique user identifier (UID), a user password (Pswd), and a unique device identifier (UDID) to a client mobile device, the method including the steps of creating a new user account using the UID and a default password (DPswd) in an inactive state in the cryptography key management system by the administrator, communicating the UID and the DPswd to the intended user using a secure communication medium by the administrator, logging into the cryptography key management system using the UID and the DPswd via the client mobile device by the intended user upon authenticating the DPswd by the cryptography key management system, changing the DPswd to a NewPswd by the intended user, sending the NewPswd that is encrypted by a cryptography key derived from the DPswd to the cryptography key management system, replacing the DPswd with the NewPswd if the NewPswd satisfies enterprise password security requirements, requesting the UDID from the client mobile device by the cryptography key management system, sending the H(UDID) encrypted using the Pswd, along with the UID to the cryptography key management system by a key management application module and associating the UDID with the user account, and registering the cryptography/data recovery key for the associated client mobile device with the enterprise using the cryptography/data recovery key, the UID, the UDID, and the KeyID.

DETAILED DESCRIPTION OF THE INVENTION

Figure 1:
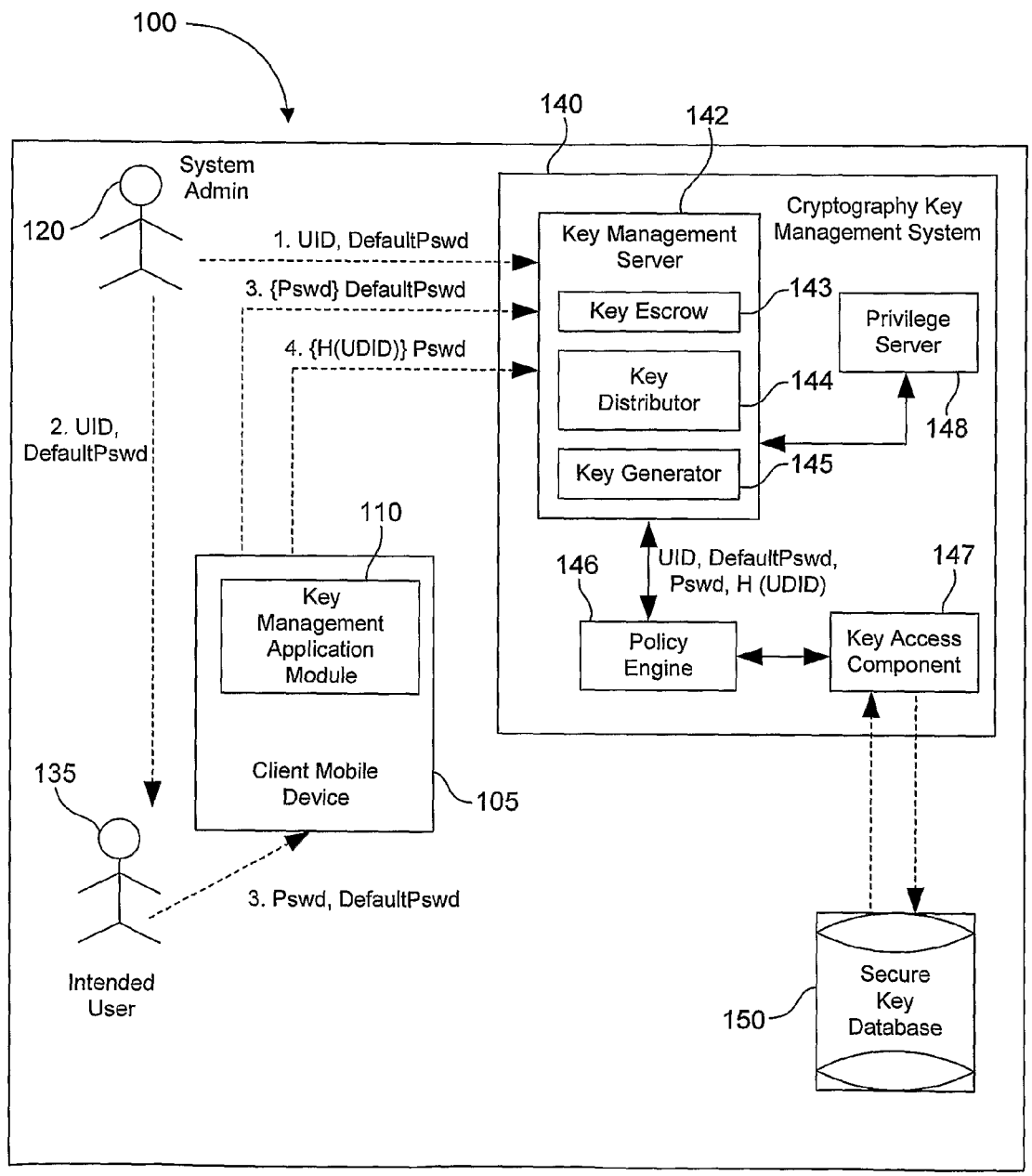
FIG. 1 shows a block diagram that illustrates a mechanism used to register a new client mobile device in an enterprise according to an embodiment of the invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The abbreviation "UID" refers to a unique user identifier. The abbreviation "UDID" refers to a unique device identifier. The abbreviation "H(UDID)" refers to a hash of UDID. The abbreviation "Pswd" refers to a user password or authentication credentials or a shared secret. The abbreviations "NewPswd" and "NPswd" both refer to a new password. The abbreviation "Key Escrow" refers to a mechanism to safely and reliably store and retrieve a cryptography key with a trusted entity for encryption and decryption of data. The abbreviation "KeyID/KID" refers to a key identifier. The abbreviation "KEC" refers to a key escrow component. The abbreviation "KMS" refers to a key management server. The abbreviation "PE" refers to a policy engine. The abbreviation "KAC" refers to a key access component. The abbreviation "Key" refers to a cryptography key used for encryption and decryption of data, and is also referred to as "data recovery key". The abbreviation "{H(UDID)} Pswd" refers to a password-encrypted H(UDID). The abbreviation "{KeyID} Pswd" refers to a password-encrypted KeyID. The abbreviation "{H(UDID), KeyID} Pswd" refers to a password-encrypted H(UDID) and KeyID. The abbreviation "{Key, KeyID} Pswd" refers to a password-encrypted Key and KeyID. The abbreviation "{H(UDID), Key, [KeyID]} Pswd" refers to a password-encrypted H(UDID), Key, KeyID combination, wherein KeyID is optional. The term "KeyID is optional" defines the requirement that KeyID may be specified optionally in the mechanism to obtain a key for encryption if a specific key is desired for encryption. If not the Key ID is used and a new key will be generated and sent to the client for encryption.

The abbreviation "{H(UDID), NewPswd} Pswd" refers to a password-encrypted H(UDID) and a New Password combination. The abbreviation "{File} Key" refers to a file encrypted with Key. The abbreviation "{Key}Pswd" refers to a password-encrypted key. The abbreviation "DPswd" refers to a default password. The abbreviation "{Pswd} DPswd" refers to a password-encrypted by default password. The abbreviation "(Clear Text)" refers to unencrypted data.

The term "desired operation" refers to all authorized operations that can be performed by an authenticated user with the cryptography key management system. Exemplary desired operations include, obtaining a cryptography key for encryption, obtaining a cryptography key for decryption, changing a password, decrypting data on a removable media if a device and/or a cryptography key is lost, registering a cryptography key, creating new user accounts and associating with devices and keys, and the like. The terms "administrator", "system administrator" and "system admin" are used interchangeably throughout the document. The terms "key management system" and "cryptography key management system" is used interchangeably throughout the document. The terms "password" and "user password" are used interchangeably throughout the document.

The proposed technique provides a key escrow and key distribution mechanism that addresses security needs of mobile devices. The proposed security mechanism addresses the security based on principles of security, such as authentication, authorization, confidentiality, integrity, and non-repudiation.

FIG. 1 shows a block diagram 100 illustrating a mechanism used to register a new mobile device in an enterprise cryptography key management system according to an embodiment of the present invention. The enterprise cryptography key management system includes a client mobile device 105, a system administrator 120, intended user 135, cryptography key management system 140, and a secure key database 150 coupled to the cryptography key management system 140. Further as shown in FIG. 1, the client mobile device 105 includes a key management application module 110. Furthermore as shown in FIG. 1, the cryptography key management system 140 includes a key management server 142, a privilege server 148, a policy engine 146, and a key access component 147. Moreover as shown in FIG. 1, the key management server 142 includes a key escrow 143, a key distributor 144, and a key generator 145.

In some embodiments, the policy engine 146 is the hub of the cryptography key management system 140 that is responsible for implementing the business process rules and policy related decision-making by interfacing with the other components in the cryptography key management system 140. The key access component 147 in the cryptography key management system 140 manages the storage and access to the secure key database 150. The key management server 142 manages the storage and distribution of data encryption keys and data recovery keys "Keys" with respect to the user. The "Keys" may or may not be the keys used to decrypt data, but they typically provide a means of deriving the decryption keys. The key generator 145 generates encryption and decryption keys based on client requests and the inputs from the policy engine, which adhere to industry standards. The privilege server 148 is responsible for authentication and authorization of clients requesting for access to key escrow or key distribution services.

In operation, in one example embodiment, the system administrator 120 creates a new user account, which includes creating a UID and assigning it a password (Pswd). In some embodiments, the Pswd is a default password DPswd. The system administrator 120 creates this new user account in an inactive state and communicates the details of the new user account including the UID and Pswd via a secure communication medium, such as, Secure Sockets Layer (SSL), secure-e-mail, and the like to the key management application module 110 in the client mobile device 105 and the cryptography key management system 140. Inactive state refers to a system condition where a user is not allowed to access their account until the system administrator 120 sets the user account to active state. The key management application module 110 and the cryptography key management system 140 store the UID and the Pswd upon receiving the UID and the Pswd from the system administrator 120.

The intended user 135 then logs into the key management application module 110 via the client mobile device 105. In some embodiments, during a first login by the intended user 135 to the enterprise cryptography key management system via the key management application module 110 using the client mobile device 105, the key management application module 110 prompts the intended user 135 to change the default Pswd. The intended user then creates a NewPswd and encrypts the NewPswd using the Default Pswd ({NewPswd}DPswd) and sends the encrypted {NewPswd}DPswd to the cryptography key management system 140. The cryptography key management system 140 then decrypts the received {NewPswd}DPswd using the stored DPswd to obtain NewPswd and stores the NewPswd as Pswd in the secure key database 150 upon a successful decryption.

The cryptography key management system 140 then prompts the key management application module 110 for a unique device identifier (UDID) associated with the client mobile device 105. The key management application module 110 then sends a hash of the UDID (H(UDID)) associated with the client mobile device 105 to the cryptography key management system 140. In some embodiments, the key management server 142 prompts the key management application module 110 for the UDID associated with the client mobile device 105. The key management application module 110 then obtains the UDID from the client mobile device 105. The key management application module 110 then forms an H(UDID) using a hashing algorithm such as MD5 and the like. The key management application module 110 then encrypts the H(UDID) using the {Pswd} to obtain a password-encrypted hash of the unique device identifier ({H(UDID)} Pswd).

In these embodiments, the key management application module 110 then sends the H(UDID) associated with the client mobile device 105 to the cryptography key management system 140 over a secure channel. A secure channel is established using a key, generated based on the shared secret already established between the client mobile device 105 and the key management system 140. The cryptography key management system 140 then authenticates the H(UDID) sent by the key management application module 110.

In some embodiments, the key management application module 110 sends the H(UDID) to the policy engine 146. The policy engine 146 then recomputes the H(UDID). The policy engine 146 then authenticates the recomputed H(UDID). The client thread is terminated if the authentication of the recomputed H(UDID) fails, i.e., if duplicate entries of the H(UDID) are found in the secure key database 150 by the policy engine 146 and the like.

The policy engine 146 stores the H(UDID) received from the key management application module 110 and updates the intended user account to an active state if the authentication is successful, i.e., if the received H(UDID) is unique and no duplicate entries of the received H(UDID) are found in the secure key database 150. The system administrator 120 can then assign a key associated with the client mobile device 105. In some embodiments, the system administrator 120 assigns the key manually. In other embodiments, the key management application module 110 lets the intended user 135 register a key associated with the client mobile device 105.

Tables 1, 2, and 3 below show an example secure key store schema, key table, and user-key mapping used in the above-described key authentication scheme for mobile devices.

TABLE 1

| UID* | UDID* | Password | Account Active (Bit) |
|---|---|---|---|
| (Clear Text) | H(UDID) | (Stored in Encrypted Format) | (Clear Text) |

TABLE 2

| Key Identifier* | Key |
|---|---|
| (Clear Text) | (Stored in Encrypted Format) |

TABLE 3

| UID* | UDID* | Key Identifier* |
|---|---|---|
| (Clear Text) | H(UDID) | (Clear Text) |

In some embodiments, there can be a password policy, which can comprise enterprise requirements associated with a password strength stored in the secure key database that is associated with the cryptography key management system 140, which can include one or more of the following restrictions:

The password can be a minimum of 8 characters long

The password can comprise alphanumeric characters

The password can be changed as per organization password expiry policy

There can be a UDID policy, such as the following:

The UDID can be an ID/Tag that uniquely identifies the mobile device

The server application can verify in the server database that no duplicates exist for the H(UDID) supplied by the client during the registration mechanism There can be a logging policy, such as the following:

A log can be maintained for all requests sent to the escrow server, for the above-mentioned mechanisms. The log will capture the details as regards to the nature of the request, UID, H(UDID) from where the request originated, the time of the request and the status of the request. The log file can be stored securely There can be a key policy, such as those listed below:

All keys issued by the system must be safely recoverable

The keys and key lengths must comply with standards

There can be a key store security policy, such as the ones listed below:

The Key Store is secured and trusted with encryption provided for the necessary fields The Key Access Component on the server can have access to the Key Store encryption/decryption keys There can be a key identifier policy, such as those listed below:

The Key Identifier for a key must be uniquely generated based on the unique device identifier of the device and the key. For example, the hash of the UDID and plain text Key blob combination could act as inputs to generate the key identifier When requesting for a particular key identifier, a check must be performed to verify that the requested key identifier is the one generated from the UDID of that particular device There can be a key registration policy, such that the system administrator can register the key for a particular device manually.

There can be a system administrator policy, such as the one listed below:
  Only the key escrow administrator can decrypt data stored on a removable drive if the device is lost
  Only the system administrator can activate/de-activate user accounts
  There can be a policy to assign a new user to a device
  The new user can be assigned a new password and key for the user device
  The old user's Key(s) can be archived in the secure key store
  The new user's data can now be encrypted with a new key
  The data encrypted by the old key(s), can be decrypted using the old key(s) obtained from the archive
There can be a policy to assign a new device to a user, such as the ones listed below:
  The user can be assigned a new password and key for the new user device
  The old users Key(s) can be archived in the secure key store
  The new user's data can be now encrypted with the new Key
  The data encrypted by the old key(s), can be decrypted using the old key(s) obtained from the archive
There can be a policy to assign a new password to a user, such that the user will be assigned a new password via a mechanism for changing a password in escrow, as described above.

Figure 2:
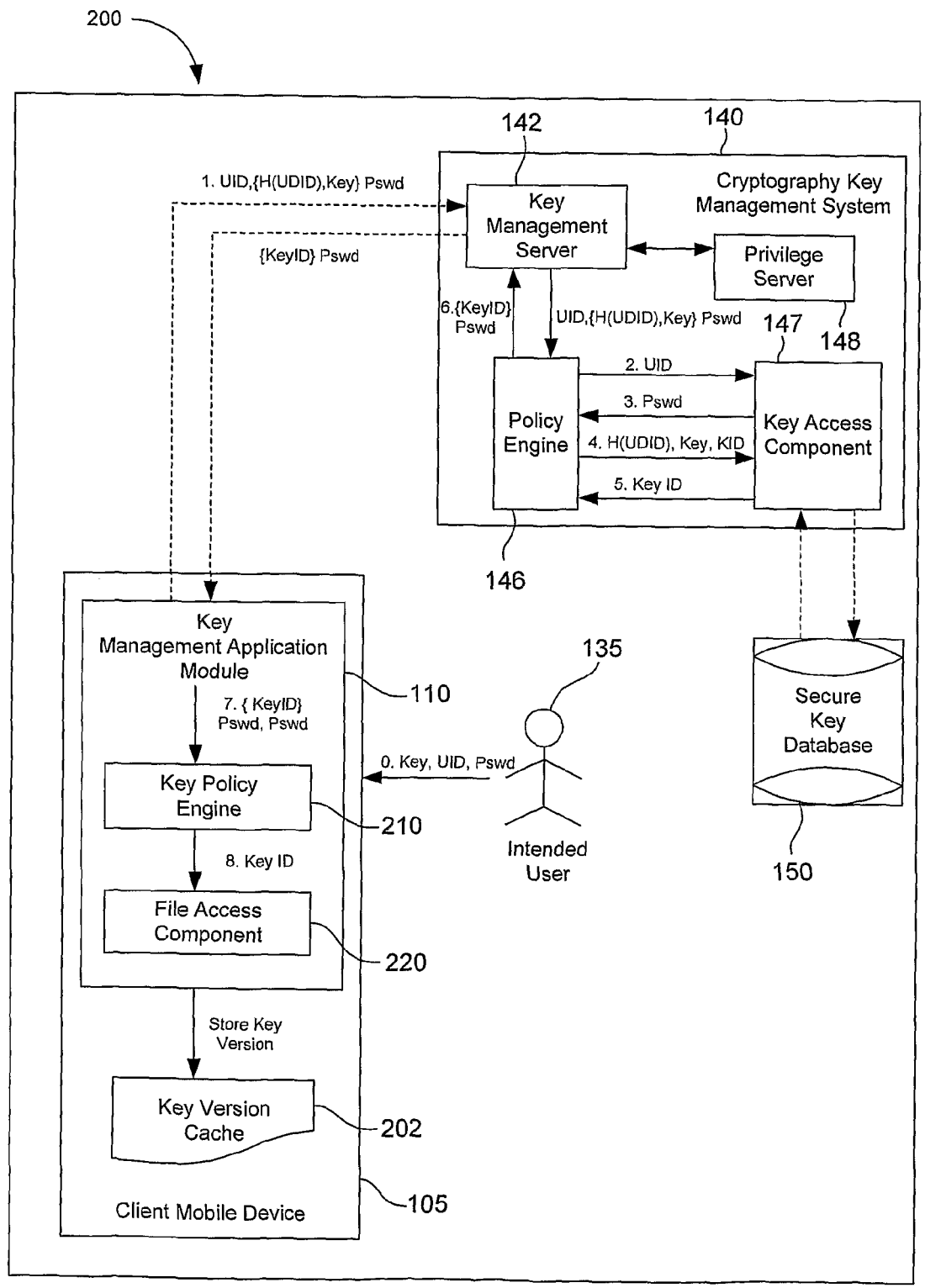
FIG. 2 is a block diagram that illustrates a mechanism used to register a key for a client mobile device in an enterprise according to an embodiment of the invention.

There can be a policy to assign a new password to a user if the old password is compromised, such as those listed below:
  The system administrator can reset the user's password and deactivate his account
  The system administrator can then assign a default password and communicate it across securely to the intended user
  The user can be mandated to change the password at first logon and his account will be set to active state again Referring now to FIG. 2, there is shown an example embodiment used to register a key for the client mobile device 105 with the cryptography key management system 140. FIG. 2 is identical to the embodiment shown in FIG. 1, except that the example block diagram 200 in FIG. 2 shows the key management application module 110 including a key policy engine 210, a file access component 220, and a key version cache 202 that are relevant to register a key associated with the client mobile device 105 with the cryptography key management system 140. Also, as shown in FIG. 2 the client mobile device 105 includes a key version cache 202 that is used in storing the version of key. FIG. 2 does not show the system administrator 120 and the associated inputs to the cryptography key management system 140 and the key management application module 110. Also not shown in FIG. 2, is the key generator 145 that is not relevant to the example embodiment of registering the key with the associated client mobile device 105 and the cryptography key management system 140.

In operation, the key management application module 110 requests for UID, data recovery key (Key), and a Pswd from the intended user 135 upon connecting to the client mobile device 105. A UDID associated with the client mobile device 105 is then determined by the key management application module 110.

The key management application module 110 then hashes the UDID to obtain an H(UDID). The H(UDID) is then encrypted along with the Key by the key management application module 110 to obtain "{H(UDID), Key} Pswd". The encryption of the H(UDID) is carried out using industry standard symmetric key encryption algorithms, and the like.

The encrypted H(UDID) along with the UID is then sent to the cryptography key management system 140 by the key management application module 110. In some embodiments, the key management application module 110 sends the "{H(UDID), Key} Pswd" and UID to the key management server 142. The key management server 142 then forwards the "{H(UDID), Key} Pswd" and the UID to the policy engine 146 in the cryptography key management system 140.

In these embodiments, the policy engine 146 then passes the UID to the key access component 147 and requests the Pswd. The cryptography key management system 140 then validates the passed UID and returns the Pswd to the client mobile device 105 via the key management application module 110. In some embodiments, the key access component 147 connects to the secure key database 150 via a valid user role and validates the passed UID by using the key management application module 110 and returns the Pswd for that associated UID to the policy engine 146.

In some embodiments, the policy engine 146 uses the Pswd obtained from the key access component 147 and decrypts "{H(UDID), Key} Pswd" to obtain "H(UDID), Key". In these embodiments, if the decryption is successful, the cryptography key management system 140 establishes the client mobile device 105 authentication. The registration of the Key is stopped and/or interrupted if the decryption fails. The policy engine 146 then generates a KeyID and passes the H(UDID), Key and KeyID to the key access component 147. The key access component 147 then validates that the H(UDID) passed by the policy engine 146 exists for that associated UID and Pswd and then stores the Key, KeyID for the UDID in the secure key database 150.

The KeyID is then encrypted using the Pswd to obtain a password-encrypted KeyID ({KeyID}Pswd). The password-encrypted KeyID is then sent to key management application module 110 by the cryptography key management system 140. In some embodiments, the policy engine 146 encrypts the KeyID with the passed Pswd to obtain a "{KeyID} Pswd" and then sends the "{KeyID} Pswd" to the client mobile device 105 via the key management server 142. In these embodiments, the key management application module 110 receives the "{KeyID} Pswd" and forwards it to the key policy engine 210 associated with the client mobile device 105.

The password-encrypted KeyID is then decrypted using the Pswd to obtain the KeyID. The obtained KeyID is then stored in the key version cache 202.

In some embodiments, key policy engine 210 decrypts "{KeyID} Pswd" using the Pswd sent by the key management application module 110 to obtain Key ID. In these embodiments, the decrypted Key ID is stored in the key version cache 202.

Figure 3:
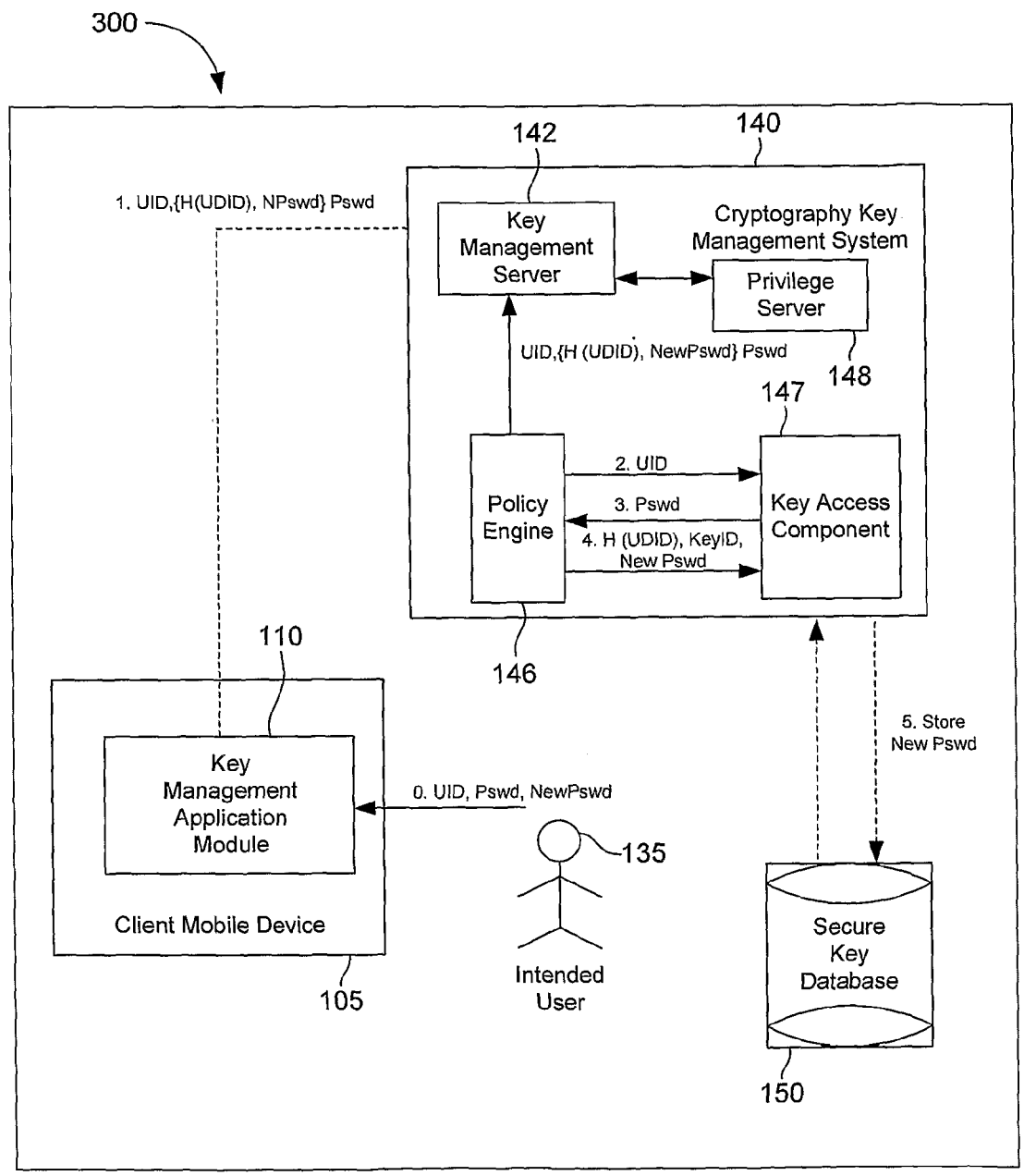
FIG. 3 is a block diagram that illustrates a mechanism used for changing a Pswd in an enterprise according to an embodiment of the invention.

Referring now to FIG. 3, there is shown an example embodiment for changing a password in an enterprise. In FIG. 3 the key management application module 110 does not illustrate the policy engine 210 and the file access component 220. In addition, the client mobile device 105 does not show the encrypted file store 310. In operation, as shown in FIG. 3, the key management application module 110 requests a UID, a CurrentPswd, and a NewPswd from an intended user 135 via the associated client mobile device 105.

The key management application module 110 then determines a UDID associated with the client mobile device 105 and hashes the UDID to form an H(UDID). The key management application module 110 then encrypts the H(UDID) and the NewPswd with the Pswd to form a "{H(UDID), NewPswd}Pswd".

The key management application module 110 then sends the "{H(UDID), NewPswd}Pswd" to the cryptography key management system 140 and requests a change in Pswd. In some embodiments, the key management application module 110 then sends the "{H(UDID), NewPswd}Pswd" and the UID to the key management server 142 and requests for a change in the CurrentPswd. The key management server 142 then forwards the associated data along with the request to the policy engine 146. The policy engine 146 then passes the UID to the key access component 147 and requests for the Pswd associated with that UID.

The cryptography key management system 140 is then connected to the secure key database 150 via a valid user role. The secure key database 150 then returns the Pswd for the associated UID upon successful validation of the UID. In some embodiments, the key access component connects to the secure key database 150 via a valid user role and validates that the UID sent by the key management application module 110 exists in the secure key database 150. The secure key database 150 then returns the Pswd for that particular UID to the policy engine 146.

The cryptography key management system 140 then decrypts the "{H(UDID), NewPswd}Pswd" using the Pswd and obtains the H(UDID) and the NewPswd. The cryptography key management system 140 then determines whether the decryption was successful. A client authentication is established upon successful decryption and the NewPswd for that H(UDID) and UID is then stored in the secure key database 150. In some embodiments, the policy engine 146 uses the Pswd and decrypts the "{H(UDID), NewPswd}Pswd" and obtains the H(UDID) and the NewPswd. In these embodiments, if decryption is successful then client authentication is established. The policy engine 146 then sends the H(UDID), the NewPswd, and the UID to the key access component 147. The key access component 147 then stores the NewPswd as the Pswd, for that particular UID and H(UDID), in the secure key database 150.

Figure 4:
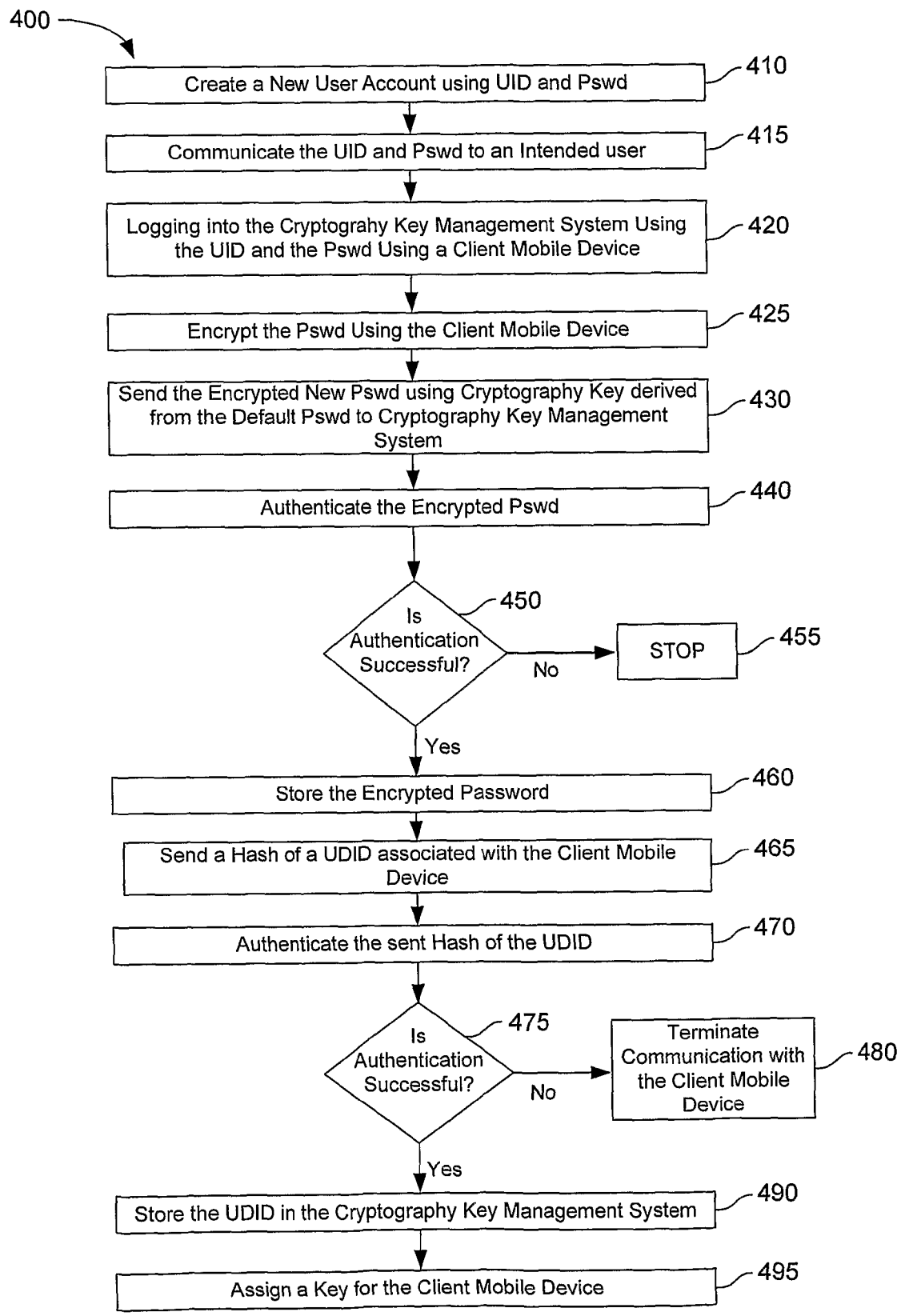
FIG. 4 is a flow chart illustrating an example method of authenticating a client mobile device in an enterprise cryptography key management system, as further described in FIGS. 1-3.

FIG. 4 illustrates an example method 400 of authenticating a client mobile device in an enterprise cryptography key management system. At step 410, this example method 400 begins by creating a new user account using a UID and a DPswd in an inactive state. At step 415, the created UID and the DPswd are communicated to an intended user connected to the cryptography key management system. At step 420, the intended user then logs into the cryptography key management system using the UID and DPswd via the connected client mobile device and creates a NewPswd.

At step 425, the New Pswd is then encrypted using the communicated password on the client mobile device. At step 430, the encrypted {New Pswd}DPswd is then sent to the cryptography key management system. At step 440, the encrypted {New Pswd}DPswd is decrypted by the cryptography key management system using the communicated password. At step 450, the method 400 checks whether the decryption was successful. Successful decryption of the NewPswd using the communicated password on the cryptography key management system is an indicator of successful authentication of the user's credentials. Based on the determination at step 450, the method 400 goes to step 455 and stops the authentication of the client mobile device if the decryption is not successful. Based on the determination at step 450, the method goes to step 460 and stores the encrypted Pswd in a secure key database if the authentication at step 450 was successful. In addition, the cryptography key management system requests a UDID from the connected client mobile device upon successful authentication.

At step 465, the client mobile device hashes the UDID to form an H(UDID) and sends the formed H(UDID) associated with the client mobile device to the cryptography key management system. At step 470, the sent H(UDID) is authenticated. At step 475, the method 400 determines whether the authentication of the H(UDID) is successful. Based on the determination at step 475, the method 400 goes to step 480 and terminates the communication with the client mobile device if the authentication at step 475 was not successful. Based on the determination at step 475, the method 400 goes to step 490 if the authentication at step 475 was successful.

At step 490, the UDID is stored in the secure key database by the cryptography key management system. At step 495, a Key is assigned to the client mobile device.

Although the flowchart 400 includes steps 410-495 that are arranged serially in the exemplary embodiment, other embodiments of the subject matter may execute two or more steps in parallel or may execute them independently or in a different order, using multiple processors or a single processor organized as two or more virtual machines or sub-processors. Moreover, still other embodiments may implement the steps as two or more specific interconnected hardware modules with related control and data signals communicated between and through the modules, or as portions of an applications-specific integrated circuit. Thus, the exemplary process flow diagram is applicable to software, firmware, and/or hardware implementations.

This following code is a pseudo implementation specific to a PocketPC platform. However, the design and mechanisms described above are platform agnostic and can be implemented on any other standard platform and device.

Creation of Private Exponent One Key

The keys for an RSA algorithm generally have two parts. The first part is referred to as a modulus. A modulus is a 512-bit number (64 bytes) and is the product of two 256-bit primes. The modulus is the same for both the public and the private keys. The second part of an RSA key is referred to as an exponent. This is a number of variable lengths, with the exponent of the public key usually being the smaller of the two. The two exponents, the public and the private, are related in a mathematical way, but determining one exponent from the other is hard without knowing the primes.

Essentially, with the RSA encryption, the plaintext viewed as a binary number, is raised to the power of the public exponent, and the remainder after dividing by the modulus is the ciphertext. To decrypt, the ciphertext is raised to the power of the private exponent, and the remainder after dividing by the modulus is the plaintext again. In Exponent one keys, the exponent part of the public and private RSA keys is set to 1. Because the key exponent is one, both the encryption and decryption do not affect the plain text, and thus essentially leave the data in plain text.

The exponent one key pair needs to be generated to export the encryption/decryption key in a PLAIN TEXT BLOB format. The following illustrates an example source code that can be used to create a private exponent one key:

```
BOOL CreatePrivateExponentOneKey(LPTSTR szProvider,
                DWORD dwProvType,
                LPTSTR szContainer,
                DWORD dwKeySpec,
                HCRYPTPROV *hProv,
                HCRYPTKEY *hPrivateKey)
{
```

```
BOOL bReturn = FALSE;
BOOL bResult = FALSE;
int n;
PBYTE pbkeyblob = NULL;
DWORD dwkeyblob;
DWORD dwBitLen;
BYTE *ptr;
__try
{
    *hProv = 0;
    *hPrivateKey = 0;
    if ((dwKeySpec != AT_KEYEXCHANGE) && (dwKeySpec !=
AT_SIGNATURE)) __leave;
    // Try to create new container
    bResult = CryptAcquireContext(hProv, szContainer,
szProvider,
                        dwProvType, CRYPT_NEWKEYSET);
    if (!bResult)
    {
        // If the container exists, open it
        if (GetLastError( ) == NTE_EXISTS)
        {
            bResult = CryptAcquireContext(hProv, szContainer,
szProvider, dwProvType, 0);
            if (!bResult)
            {
                // No good, leave
                __leave;
            }
        }
        else
        {
            // No good, leave
            __leave;
        }
    }
    // Generate the private key
    bResult = CryptGenKey(*hProv, dwKeySpec,
CRYPT_EXPORTABLE, hPrivateKey);
    if (!bResult) __leave;
    // Export the private key, we'll convert it to a private
    // exponent of one key
    bResult = CryptExportKey(*hPrivateKey, 0, PRIVATEKEYBLOB,
0, NULL, &dwkeyblob);
    if (!bResult) __leave;
    pbkeyblob = (PBYTE)LocalAlloc(LPTR, dwkeyblob);
    if (!pbkeyblob) __leave;
bResult = CryptExportKey(*hPrivateKey, 0, PRIVATEKEYBLOB, 0,
pbkeyblob, &dwkeyblob);
    if (!bResult) __leave;
    CryptDestroyKey(*hPrivateKey);
    *hPrivateKey = 0;
    // Get the bit length of the key
    memcpy(&dwBitLen, &pbkeyblob[12], 4);
    // Modify the Exponent in Key BLOB format
    // Key BLOB format is documented in SDK
    // Convert pubexp in rsapubkey to 1
    ptr = &pbkeyblob[16];
    for (n = 0; n < 4; n++)
    {
        if (n == 0) ptr[n] = 1;
        else ptr[n] = 0;
    }
    // Skip pubexp
    ptr += 4;
    // Skip modulus, prime1, prime2
    ptr += (dwBitLen/8);
    ptr += (dwBitLen/16);
    ptr += (dwBitLen/16);
    // Convert exponent1 to 1
    for (n = 0; n < (dwBitLen/16); n++)
    {
        if (n == 0) ptr[n] = 1;
        else ptr[n] = 0;
    }
    // Skip exponent1
    ptr += (dwBitLen/16);
    // Convert exponent2 to 1
    for (n = 0; n < (dwBitLen/16); n++)
    {
        if (n == 0) ptr[n] = 1;
        else ptr[n] = 0;
    }
    // Skip exponent2, coefficient
    ptr += (dwBitLen/16);
    ptr += (dwBitLen/16);
    // Convert privateExponent to 1
    for (n = 0; n < (dwBitLen/8); n++)
    {
        if (n == 0) ptr[n] = 1;
        else ptr[n] = 0;
    }
    // Import the exponent-of-one private key.
    if (!CryptImportKey(*hProv, pbkeyblob, dwkeyblob, 0, 0,
hPrivateKey))
    {
        __leave;
    }
    bReturn = TRUE;
}
__finally
{
    if (pbkeyblob) LocalFree(pbkeyblob);
    if (!bReturn)
    {
        if (*hPrivateKey) CryptDestroyKey(*hPrivateKey);
        if (*hProv) CryptReleaseContext(*hProv, 0);
    }
}
return bReturn;
}
```

The following illustrates an example source code that can be used to generate a random session key:

```
BOOL GenerateRandomSessionKey(HCRYPTPROV hProv,
ALG_ID Alg,
                        HCRYPTKEY *hSessionKey)
{
    BOOL bResult;
    *hSessionKey = 0;
    bResult = CryptGenKey(hProv, Alg,
CRYPT_EXPORTABLE, hSessionKey);
    if (!bResult)
    {
        return FALSE;
    }
    return TRUE;
}
```

The following illustrates an example source code that can be used to derive a session key from a password:

```
BOOL GenerateSessionKeyFromPassword(HCRYPTPROV hProv,
                        ALG_ID Alg,
                        PBYTE lpHashingData,
                        DWORD dwHashingData,
                        HCRYPTKEY *hSessionKey)
{
    BOOL bResult;
    BOOL bReturn = FALSE;
    HCRYPTHASH hHash = 0;
    __try
    {
        *hSessionKey = 0;
        bResult = CryptCreateHash(hProv, CALG_SHA1, 0, 0, &hHash);
        if (!bResult) __leave;
        bResult = CryptHashData(hHash, lpHashingData,
dwHashingData, 0);
        if (!bResult) __leave;
        bResult = CryptDeriveKey(hProv, Alg, hHash,
CRYPT_EXPORTABLE, hSessionKey);
        if (!bResult) __leave;
        bReturn = TRUE;
    }
    __finally
    {
        if (hHash) CryptDestroyHash(hHash);
```

The following illustrates an example source code that can be used to export a session key in a plain blob format:
//We use the above derived "exponent one Key" to export the session key to a plain blob //format.

```
//We use the above derived "exponent one Key" to export the
session key to a plain blob //format.
BOOL ExportPlainSessionBlob(HCRYPTKEY hPublicKey,
                HCRYPTKEY hSessionKey,
                PBYTE *pbKeyMaterial ,
                DWORD *dwKeyMaterial )
{
  BOOL bReturn = FALSE;
  BOOL bResult;
  DWORD dwSize, n;
  PBYTE pbSessionBlob = NULL;
  DWORD dwSessionBlob;
  PBYTE pbPtr;
  __try
  {
    *pbKeyMaterial = NULL;
    *dwKeyMaterial = 0;
    bResult = CryptExportKey(hSessionKey, hPublicKey,
SIMPLEBLOB,
                0, NULL, &dwSessionBlob );
    if (!bResult) __leave;
    pbSessionBlob = (PBYTE)LocalAlloc(LPTR, dwSessionBlob );
    if (!pbSessionBlob) __leave;
    bResult = CryptExportKey(hSessionKey, hPublicKey,
SIMPLEBLOB,
                0, pbSessionBlob , &dwSessionBlob
);
    if (!bResult) __leave;
    // Get session key size in bits
    dwSize = sizeof(DWORD);
bResult = CryptGetKeyParam(hSessionKey, KP_KEYLEN,
  (PBYTE)dwKeyMaterial, &dwSize,
0);
    if (!bResult) __leave;
    // Get the number of bytes and allocate buffer
    *dwKeyMaterial /= 8;
    *pbKeyMaterial = (PBYTE)LocalAlloc(LPTR, *dwKeyMaterial);
    if (!*pbKeyMaterial) __leave;
    // Skip the header
    pbPtr = pbSessionBlob;
    pbPtr += sizeof(BLOBHEADER);
    pbPtr += sizeof(ALG_ID);
    // We are at the beginning of the key
    // but we need to start at the end since
    // it's reversed
    pbPtr += (*dwKeyMaterial – 1);
    // Copy the raw key into our return buffer
    for (n = 0; n < *dwKeyMaterial; n++)
    {
      (*pbKeyMaterial)[n] = *pbPtr;
      pbPtr--;
    }
    bReturn = TRUE;
  }
  __finally
  {
    if (pbSessionBlob) LocalFree(pbSessionBlob);
    if ((!bReturn) && (*pbKeyMaterial ))
    {
      LocalFree(*pbKeyMaterial );
      *pbKeyMaterial = NULL;
      *dwKeyMaterial = 0;
    }
  }
  return bReturn;
}
```

The following illustrates an example source code that can be used to import a session key from plain blob format:

```
BOOL ImportPlainSessionBlob(HCRYPTPROV hProv,
                HCRYPTKEY hPrivateKey,
                ALG_ID dwAlgId,
                PBYTE pbKeyMaterial ,
                DWORD dwKeyMaterial ,
                HCRYPTKEY *hSessionKey)
{
  BOOL bResult;
  BOOL bReturn = FALSE;
  BOOL fFound = FALSE;
  PBYTE pbSessionBlob = NULL;
  DWORD dwSessionBlob, dwSize, n;
  DWORD dwPublicKeySize;
  DWORD dwProvSessionKeySize;
  ALG_ID dwPrivKeyAlg;
  PBYTE pbPtr;
  DWORD dwFlags = CRYPT_FIRST;
  PROV_ENUMALGS_EX ProvEnum;
  HCRYPTKEY hTempKey = 0;
  __try
  {
    // Double check to see if this provider supports this
algorithm
    // and key size
    do
    {
      dwSize = sizeof(ProvEnum);
      bResult = CryptGetProvParam(hProv, PP_ENUMALGS_EX,
  (PBYTE)&ProvEnum,
                &dwSize, dwFlags);
      if (!bResult) break;
      dwFlags = 0;
      if (ProvEnum.aiAlgid == dwAlgId) fFound = TRUE;
    } while (!fFound);
    if (!fFound) __leave;
    // We have to get the key size(including padding)
    // from an HCRYPTKEY handle. PP_ENUMALGS_EX contains
    // the key size without the padding so we can't use it.
    bResult = CryptGenKey(hProv, dwAlgId, 0, &hTempKey);
    if (!bResult) __leave;
    dwSize = sizeof(DWORD);
    bResult = CryptGetKeyParam(hTempKey, KP_KEYLEN,
(PBYTE)&dwProvSessionKeySize,
                &dwSize, 0);
    if (!bResult) __leave;
    CryptDestroyKey(hTempKey);
    hTempKey = 0;
    // Our key is too big, leave
    if ((dwKeyMaterial * 8) > dwProvSessionKeySize) __leave;
    // Get private key's algorithm
    dwSize = sizeof(ALG_ID);
    bResult = CryptGetKeyParam(hPrivateKey, KP_ALGID,
(PBYTE)&dwPrivKeyAlg, &dwSize,
0);
    if (!bResult) __leave;
    // Get private key's length in bits
    dwSize = sizeof(DWORD);
    bResult = CryptGetKeyParam(hPrivateKey, KP_KEYLEN,
(PBYTE)&dwPublicKeySize,
&dwSize, 0);
    if (!bResult) __leave;
    // calculate Simple blob's length
    dwSessionBlob = (dwPublicKeySize/8) + sizeof(ALG_ID) +
sizeof(BLOBHEADER);
    // allocate simple blob buffer
    pbSessionBlob = (PBYTE)LocalAlloc(LPTR, dwSessionBlob);
    if (!pbSessionBlob) __leave;
    pbPtr = pbSessionBlob;
    // SIMPLEBLOB Format is documented in SDK
    // Copy header to buffer
    ((BLOBHEADER *)pbPtr)->bType = SIMPLEBLOB;
    ((BLOBHEADER *)pbPtr)->bVersion = 2;
    ((BLOBHEADER *)pbPtr)->reserved = 0;
    ((BLOBHEADER *)pbPtr)->aiKeyAlg = dwAlgId;
    pbPtr += sizeof(BLOBHEADER);
    // Copy private key algorithm to buffer
    *((DWORD *)pbPtr) = dwPrivKeyAlg;
```

```
        pbPtr += sizeof(ALG_ID);
        // Place the key material in reverse order
        for (n = 0; n < dwKeyMaterial; n++)
        {
            pbPtr[n] = pbKeyMaterial[dwKeyMaterial-n-1];
        }
        // 3 is for the first reserved byte after the key material +
the 2 reserved bytes
// at the end.
        dwSize = dwSessionBlob - (sizeof(ALG_ID) +
sizeof(BLOBHEADER) + dwKeyMaterial + 3);
        pbPtr += (dwKeyMaterial+1);
        // Generate random data for the rest of the buffer
        // (except that last two bytes)
        bResult = CryptGenRandom(hProv, dwSize, pbPtr);
        if (!bResult) __leave;
        for (n = 0; n < dwSize; n++)
        {
            if (pbPtr[n] == 0) pbPtr[n] = 1;
        }
        pbSessionBlob[dwSessionBlob - 2] = 2;
        bResult = CryptImportKey(hProv, pbSessionBlob ,
dwSessionBlob,
                        hPrivateKey,CRYPT_EXPORTABLE,
hSessionKey);
        if (!bResult) __leave;
        bReturn = TRUE;
    }
    __finally
    {
        if (hTempKey) CryptDestroyKey(hTempKey);
        if (pbSessionBlob) LocalFree(pbSessionBlob);
    }
    return bReturn;
}
```

The following illustrates an example source code to encrypt a file:

```
BOOL EncryptFile(LPCTSTR lpInFileName, LPCTSTR
lpOutFileName,PBYTE szPassword)
{
    HANDLE          hInFile, hOutFile;
    BOOL            finished, bResult;
    HCRYPTPROV      hProv = 0;
    HCRYPTKEY       hKey    = 0, hExchangeKey = 0;//, hKey1 = 0;
    HCRYPTHASH      hHash = 0;
    DWORD           dwByteCount, dwBytesWritten;
    DWORD dwHashingData = 0;
    PBYTE pbBuffer = NULL;
    // Get handle for the default provider.
    bResult = CryptAcquireContext(
            &hProv,
            L"TestContainer1",
            MS_ENHANCED_PROV,
            PROV_RSA_FULL,
            0);
    if(bResult == FALSE)
    {
        Error(TEXT("Error in Acquiring Context in Outside
Create!"));
        bResult = CryptAcquireContext(
            &hProv,         //variable to hold
returned handle
            L"TestContainer1",//use named key container
            MS_ENHANCED_PROV,    //use named CSP
            PROV_RSA_FULL,   //type of provider to acquire
            CRYPT_NEWKEYSET  //create new key container
            );
        if(bResult == FALSE)
        {
            Error(TEXT("Error in Acquiring Context in
Create!"));
            exit(0);
        }
    }
    //retrieve the exchange key
    bResult = CreatePrivateExponentOneKey(MS_ENHANCED_PROV,
PROV_RSA_FULL,
                        L"TestContainer1",
        AT_KEYEXCHANGE,
                        &hProv,
        &hExchangeKey);
    if (bResult == FALSE)
    {
        Error(TEXT(CreatePrivateExponentOneKey failed ));
        exit(0);
    }
    //-----------------------------------------------------------
    // Generate a session key.
    if(szPassword != NULL)
    {
        //-----------------------------------------------------------
        // Create a key from password.
        bResult = GenerateSessionKeyFromPassword(hProv,
                    CALG_3DES,
                    szPassword,
                    dwHashingData,
                    &hKey);
    }
    else
    {
        //-----------------------------------------------------------
        // Generate a random key.
        bResult = GenerateRandomSessionKey(hProv,
                    CALG_3DES,
                    &hKey);
    }
    //create an exportable key blob with a call to
CryptExportKey
    //the key blob is an encrypted version of our encryption
key
    // The first call to ExportKey with NULL gets the key size.
    dwByteCount=0;//hExchangeKey, PLAINTEXTKEYBLOB
    bResult = ExportPlainSessionBlob(hExchangeKey, hKey,
                    &pbBuffer , &dwByteCount
    );
    if (bResult == FALSE)
    {
        Error(TEXT("export session blob failed"));
        exit(0);
    }
    // Open infile and create outfile.
    hInFile = CreateFile(lpInFileName,
            GENERIC_READ, FILE_SHARE_READ, NULL,
            OPEN_EXISTING, FILE_ATTRIBUTE_NORMAL, NULL);
    hOutFile = CreateFile(lpOutFileName, GENERIC_WRITE,
    FILE_SHARE_READ,
            NULL, CREATE_ALWAYS, FILE_ATTRIBUTE_NORMAL,
    NULL);
    // Write size of key blob, then key blob itself, to output
file.
    bResult = WriteFile(hOutFile, &dwByteCount, sizeof(dwByteCount),
            &dwBytesWritten, NULL);
    if(bResult == FALSE)
    {
        Error(TEXT("error writing blob size"));
        exit(0);
    }
    bResult = WriteFile(hOutFile, pbBuffer, dwByteCount,
&dwBytesWritten, NULL);
    if(bResult == FALSE)
    {
        Error(TEXT("error writing blob"));
        exit(0);
    }
    // Now, read data in, encrypt it, and write encrypted data
to output.
    do
    {
        ReadFile(hInFile, pbBuffer,
    IN_BUFFER_SIZE,&dwByteCount,NULL);
        finished = (dwByteCount < IN_BUFFER_SIZE);
```

-continued

```
    bResult = CryptEncrypt(hKey, 0, finished, 0,
pbBuffer, &dwByteCount,
            OUT_BUFFER_SIZE);
        if(bResult == FALSE)
        {
            Error(TEXT("Encryption Failed"));
        }
        WriteFile(hOutFile, pbBuffer, dwByteCount,
&dwBytesWritten,
            NULL);
    } while (!finished);
    //clean up
    CloseHandle(hInFile);
    CloseHandle(hOutFile);
    if (pbBuffer ) free(pbBuffer );
    if (hKey) CryptDestroyKey(hKey);
    if (hExchangeKey) CryptDestroyKey(hExchangeKey);
    if (hProv)
    {
        CryptReleaseContext(hProv, 0);
    }
    return 0;
}
```

The following illustrates an example source code that can be used to decrypt a file:

```
BOOL DecryptFile(LPCTSTR lpInFileName, LPCTSTR lpOutFileName)
{
    HANDLE        hInFile, hOutFile;
    BOOL          finished, bResult;
    HCRYPTPROV    hProv = 0;
    HCRYPTKEY     hKey    = 0, hExchangeKey = 0;//, hKey1 = 0;
    HCRYPTHASH    hHash = 0;
    DWORD         dwByteCount, dwBytesWritten;
    PBYTE pbBuffer = NULL;
    BYTE pbOutBuffer[OUT_BUFFER_SIZE];
    //Get handle for the default provider.
    bResult = CryptAcquireContext(
        &hProv,
        L"TestContainer1",
        MS_ENHANCED_PROV,
        PROV_RSA_FULL,
        0);
    if(bResult == FALSE)
    {
        Error(TEXT("Error in Acquiring Context in Outside
Create!"));
        bResult = CryptAcquireContext(
            &hProv,         //variable to hold returned
handle
            L"TestContainer1",//use named key container
            MS_ENHANCED_PROV,      //use named CSP
            PROV_RSA_FULL,   //type of provider to acquire
            CRYPT_NEWKEYSET  //create new key container
            );
        if(bResult == FALSE)
        {
            Error(TEXT("Error in Acquiring Context in Create!"));
            exit(0);
        }
    }
    //retrieve the exchange key
    bResult = CreatePrivateExponentOneKey(MS_ENHANCED_PROV,
PROV_RSA_FULL,
            L"TestContainer1",
AT_KEYEXCHANGE,
            &hProv,
&hExchangeKey);
    if (bResult == FALSE)
    {
        Error(TEXT("CreatePrivateExponentOneKey failed));
        exit(0);
    }
    hInFile = CreateFile(lpInFileName, GENERIC_READ,
FILE_SHARE_READ,
        NULL, OPEN_EXISTING, FILE_ATTRIBUTE_NORMAL,
        NULL);
    hOutFile = CreateFile(lpOutFileName, GENERIC_WRITE,
FILE_SHARE_READ,
        NULL, CREATE_ALWAYS, FILE_ATTRIBUTE_NORMAL,
        NULL);
    // Read in key blob size, then key blob itself from input
file.
    ReadFile(hInFile,&dwByteCount,sizeof(dwByteCount),
        &dwBytesWritten,NULL);
    pbBuffer = (BYTE*)malloc(dwByteCount);
    ReadFile(hInFile, pbBuffer, dwByteCount, &dwBytesWritten,
NULL);
    // Import Key blob into "CSP"
    //i.e. we convert the key blob back into a key
//hExchangeKey
    bResult = ImportPlainSessionBlob(hProv, hExchangeKey, CALG_3DES,
pbBuffer, dwByteCount, &hKey);
    if(bResult == FALSE)
    {
        Error(TEXT("import session key failed"));
        exit(0);
    }
    // WriteFile(hOutFile,
pbBuffer,dwByteCount,&dwBytesWritten,NULL);
    // Read data in, decrypt it, and write decrypted data to
output file.
    do
    {
        ReadFile(hInFile, pbOutBuffer, IN_BUFFER_SIZE,
&dwByteCount,NULL);
        finished = (dwByteCount < IN_BUFFER_SIZE);
        bResult = CryptDecrypt(hKey, 0, finished, 0,
pbOutBuffer, &dwByteCount);
        bResult = GetLastError( );
        if(bResult == FALSE)
        {
            Error(TEXT("decryption failed"));
        }
        WriteFile(hOutFile,
pbOutBuffer,dwByteCount,&dwBytesWritten,NULL);
    } while (!finished);
    //clean up
    CloseHandle(hInFile);
    CloseHandle(hOutFile);
    if (pbBuffer ) free(pbBuffer );
    if (hKey) CryptDestroyKey(hKey);
    if (hExchangeKey) CryptDestroyKey(hExchangeKey);
    if (hProv)
    {
        CryptReleaseContext(hProv, 0);
    }
    return 0;
}
```

The following illustrates an example source code that can be used to generate a key identifier by hashing a UDID and a plain text key blob:

The hash of the UDID and the plain text key blob could act as a unique key identifier.

```
BOOL GenerateUniqueKeyID(LPCWSTR szDestination,
        LPCWSTR szdata)
{
    // Declare and initialize local variables.
    FILE *hDestination;
    HCRYPTPROV hCryptProv;
    HCRYPTHASH hHash;
    PBYTE pbHash;
    DWORD dwHashLen;
    DWORD dwCount;
    BOOL bStatus = FALSE;
    // Open the destination file.
    if(!(hDestination = _wfopen(szDestination,L"wb")))
    {
        Error("Error opening plaintext file!");
    }
```

```
// Get a handle to the default provider.
if(!CryptAcquireContext(
        &hCryptProv,
        L"TestContainer1",
        MS_ENHANCED_PROV,
        PROV_RSA_FULL,
        0))
{
    Error("Error during CryptAcquireContext!");
}
// Create a hash object.
if(!CryptCreateHash(
        hCryptProv,
        CALG_MD5,
        0,
        0,
        &hHash))
{
    Error("Error during CryptCreateHash!");
}
// Hash in the password data.
if(!CryptHashData(
        hHash,
        (PBYTE)szdata,
        wcslen(szdata),
        0))
{
    Error("Error during CryptHashData!");
}
// Read the hash value size and allocate memory.
dwCount = sizeof(DWORD);
if(!CryptGetHashParam(hHash, HP_HASHSIZE,
    (BYTE *) &dwHashLen, &dwCount, 0))
{
    Error("Error %x during reading hash size!");
}
if((pbHash = (PBYTE)malloc(dwHashLen)) == NULL)
{
    Error("Out of memory!");
}
// Read the hash value.
if(!CryptGetHashParam(hHash, HP_HASHVAL,
pbHash, &dwHashLen, 0))
{
    Error("Error %x during reading hash value!");
}
// Write data to destination file.
fwrite(
    pbHash,
    dwHashLen,
    dwCount,
    hDestination);
if(ferror(hDestination))
{
    Error("Error writing plaintext!");
}
bStatus = TRUE;
// Close files.
if(hDestination)
{
    if(fclose(hDestination))
        Error("Error closing destination file");
}
// Free memory.
if(pbHash)
{
    free(pbHash);
}
// Destroy the hash object.
if(!(CryptDestroyHash(hHash)))
{
    Error("Error during CryptDestroyHash");
}
hHash = 0;
// Release provider handle.
if(hCryptProv)
{
    if(!(CryptReleaseContext(hCryptProv, 0)))
        Error("Error during CryptReleaseContext");
}
}
return bStatus;
}
```

The following illustrates an example source code that can be used to obtain a UDID for a pocket PC 2002 device:

```
#define IOCTL_HAL_GET_DEVICEID
CTL_CODE(FILE_DEVICE_HAL, 21,
METHOD_BUFFERED, FILE_ANY_ACCESS)
CString GetSerialPPC2002Number( )
{
    DWORD dwOutBytes;
    const int nBuffSize = 4096;
    byte arrOutBuff[nBuffSize];
    BOOL bRes = ::KernelIoControl(IOCTL_HAL_GET_DEVICEID,
                    0, 0, arrOutBuff, nBuffSize,
&dwOutBytes);
    if (bRes) {
        CString strDeviceInfo;
        for (unsigned int i = 0; i<dwOutBytes; i++) {
            CString strNextChar;
            strNextChar.Format(TEXT("%02X"), arrOutBuff[i]);
            strDeviceInfo += strNextChar;
        }
        CString strDeviceId =
            strDeviceInfo.Mid(40,2) +
            strDeviceInfo.Mid(45,9) +
            strDeviceInfo.Mid(70,6);
        return strDeviceId;
    }
    else
    {
        return _T("");
    }
}
```

The above technique addresses the security and data integrity needs of mobile devices and removable media that cache sensitive enterprise data. Further, the technique binds the decryption keys to a particular mobile device and a user. This means that the data encrypted on a particular device by a particular user can be decrypted only on that device and by that user.

Following are some examples of security threats, to encrypted data cached on the mobile device and removable media, that are addressed using the above described techniques:

If a mobile device is lost or stolen or falls in the wrong hands, the user will be prevented from decrypting the encrypted data.

If a removable media is lost or stolen or falls in the wrong hands, the user will be prevented from decrypting the data without having possession of the mobile device on which the data was originally encrypted and the correct credentials.

Any malicious intent of copying or beaming encrypted data onto a different device and trying to decrypt the data by a user will be prevented.

This technique also addresses all the basic requirements of data security in an enterprise; for example, authentication, confidentiality, integrity, authorization, non-repudiation (note that, in this context the definition of non-repudiation is limited to non-deniability), and other such data security requirements. These security requirements are addressed in the various mechanisms spelt out for key escrow and distribution. The mechanisms described above are original and are based on industry proven algorithms and security protocols. The proposed technique applies these raw technologies and concepts to address mobile device security and solutions.

In addition, the above approach provides administrative mechanisms, which can be executed only by using administrative credentials to override the general functionality of the system. These mechanisms can be typically used to recover encrypted data if a user leaves the organization, if the data is backed up in a secure location, cached on removable media, and/or the device on which the original encryption was performed is lost. Furthermore, administration or government requirements for escrow can also be addressed.

The above technique addresses computational and battery power limitations of mobile devices. The present invention does not rely on public key certificates, CA, or on the existence of PKI, which require higher computational power that is undesirable in the context of mobile devices. Moreover, the present invention relies on industry proven symmetric key mechanisms for mutual authentication, transit security, and local data encryption and decryption. The symmetric key based mechanisms require lesser processing and computational power. Also, the present invention significantly reduces usage of computing and battery resources in mobile devices.

The above-described techniques do not rely on the existence of a public key deployment. Hence they provide a cost effective solution for a large number of mobile devices in an enterprise. Further, this approach does not require manual intervention and relies on industry proven mechanisms and algorithms for security requirements. Hence, this approach is also feasible for large-scale mobile deployments.

This approach can be easily plugged into any existing security management infrastructure. It can also accommodate industry standard algorithms, protocols, and/or mechanisms. Further, the architecture provides scalability and availability. Furthermore, the approach can leverage trusted platforms for enhanced security. The mechanism of mutual authentication before transfer of keys becomes simpler with the use of trusted platforms. This is because the establishment of trust becomes simpler when the entities used in the transaction are trusted platforms. In addition, mechanisms for auditing and logging of access and activities on the enterprise are provided by trusted platform modules. Trusted platforms provide for binding data to a particular software state on the device. This can be leveraged to enhance the mechanism for binding the data to a device and a user.

This approach also addresses the needs of a general key escrow and distribution system as mentioned above. This approach provides a significant cost savings over traditional PKI based installations. Also, the proposed technique is computationally inexpensive and well suited for the processing capabilities of mobile devices. Further, the mobile device can be plugged into any existing key management infrastructure, thus enhancing the capabilities of existing installations.

Figure 5:
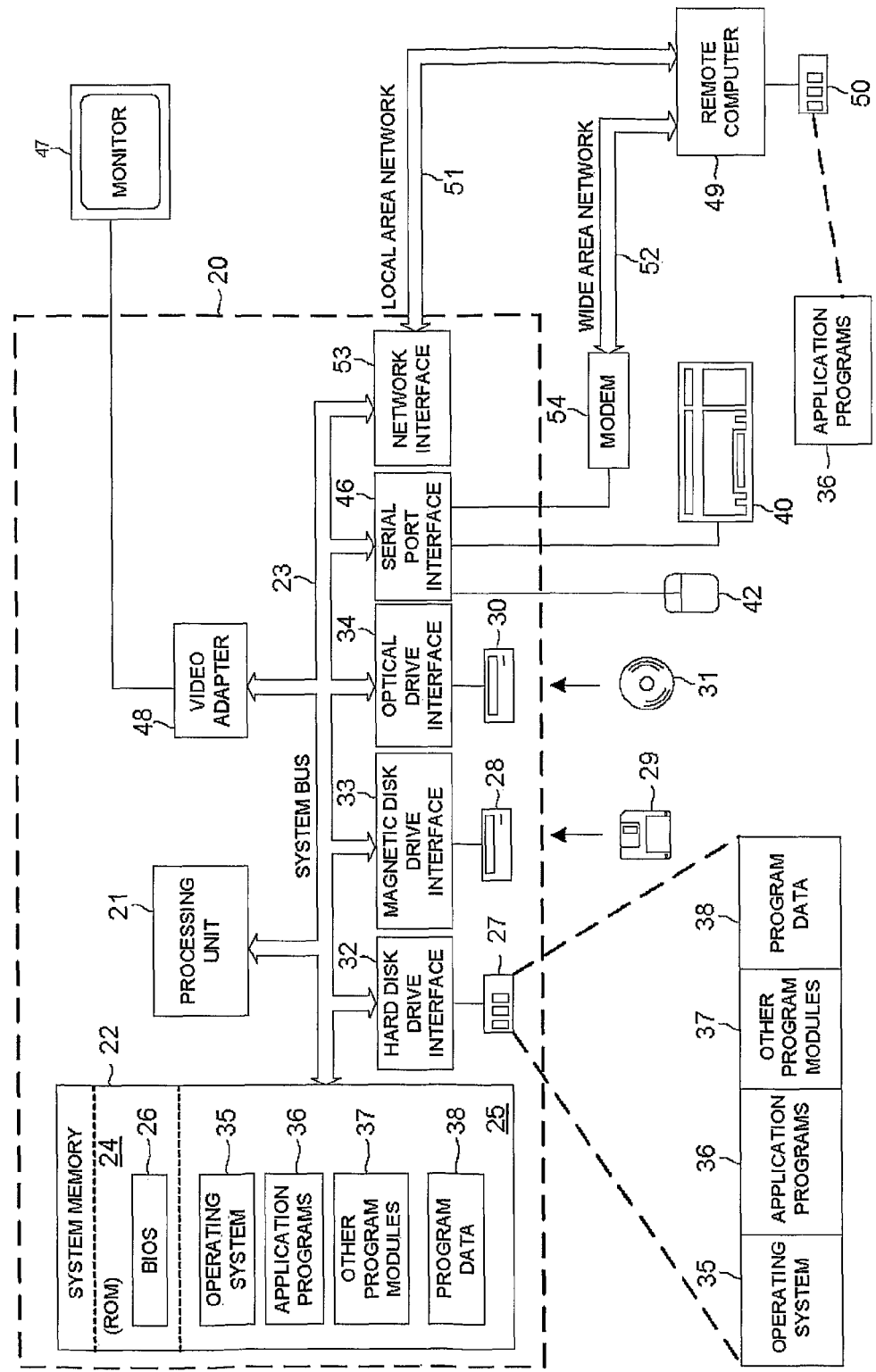
FIG. 5 is a schematic block diagram of an exemplary information-processing system that can be used in conjunction with various embodiments of the present invention, such as those in FIGS. 1-3.

FIG. 5 is an overview diagram of hardware and operating environment in conjunction with which various embodiments of the invention may be practiced. The description of FIG. 5 is intended to provide a brief, general description of suitable computer hardware and a suitable computing environment in conjunction with which some embodiments of the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by remote processing I/O devices that are linked through a communications network. In a distributed computing environment, program modules may be located in both local and remote memory storage devices.

In the embodiment shown in FIG. 5, a hardware and operating environment is provided that is applicable to any of the information systems and tools shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any one of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk 27, magnetic disk 29, optical disk 31, ROM 24, or RAM 25, including an operating system 35, one or more application programs 36, other program modules 37, and program data 38. For example, a cryptography key management system may be implemented as one or more program modules. For example, the one or more application programs 36 can include programs for the cryptography key management for a client mobile device as described with reference to FIGS. 1-4.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or a common network node, and typically includes many or all of the elements described above relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, which are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The above-described technique provides various embodiments for authenticating a mobile device in an enterprise cryptography key management system. It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 4 can be performed in a different order from those shown and described herein.

FIGS. 1-5 are merely representational and are not drawn to scale. Certain proportions thereof may be exaggerated, while others may be minimized. FIGS. 1-5 illustrate various embodiments of the subject matter that can be understood and appropriately carried out by those of ordinary skill in the art.

The invention claimed is:

1. A method comprising binding encryption and decryption keys using a unique user identifier (UID), a unique device identifier (UDID), and a user password (Pswd) to a client mobile device in an enterprise cryptography key management system, wherein binding the encryption and decryption keys comprises:
   requesting the UDID from the client mobile device by the cryptography key management system;
   receiving a hashed unique device identifier H(UDID) encrypted by the Pswd by the cryptography key management system from a key management application module included on the client mobile device; and
   associating the H(UDID) with the user account, comprising:
      decrypting the encrypted H(UDID) by the cryptography key management system using the Pswd;
      if decryption fails, then terminating communication with the client mobile device; and
      if the decryption is successful, then validating integrity of the decrypted H(UDID) by comparing the H(UDID) sent by the key management application module with other H(UDID)s in the cryptography key management system to ensure that the H(UDID) is unique for the client mobile device; and
   registering a cryptography/data recovery key for the associated client mobile device with the enterprise using the cryptography/data recovery key, the UID, the H(UDID), and a unique key identifier (KeyID),
   wherein registering the cryptography/data recovery key for the associated client mobile device with the enterprise comprises, upon validating that the H(UDID) exists for the UID:

storing the data recovery key and the KeyID associated with the UDID by the cryptography key management system, encrypting the KeyID using a symmetric cryptography key derived from the Pswd to obtain a password-encrypted KeyID and sending the password-encrypted KeyID to the key management application module by the cryptography key management system, and decrypting the password-encrypted KeyID using a symmetric cryptography key derived from the password to obtain the KeyID and storing the obtained KeyID by the key management application module.

2. The method of claim 1, wherein binding the encryption and decryption keys using the UID, the UDID, and the Pswd further comprises:

creating a new user account using the UID and a default password (DPswd) in an inactive state in the cryptography key management system by an administrator;

communicating the UID and the DPswd to an intended user using a secure communication medium by the administrator;

logging into the cryptography key management system using the UID and the DPswd via the client mobile device by the intended user upon authenticating the DPswd by the cryptography key management system;

changing the DPswd to a new password (NewPswd) by the intended user;

sending the NewPswd that is encrypted by a cryptography key derived from the DPswd to the cryptography key management system; and replacing the DPswd with the NewPswd if the NewPswd satisfies enterprise password security requirements.

3. The method of claim 2, wherein the cryptography/data recovery key is selected from a group consisting of a symmetric cryptography key and an asymmetric cryptography key.

4. The method of claim 2, wherein sending the H(UDID) obtained using the UDID associated with the client mobile device to the cryptography key management system by a key management application module and associating the H(UDID) with the user account comprises:

hashing the UDID of the client mobile device to create the H(UDID);

encrypting the H(UDID) using the Pswd:

sending the password encrypted H(UDID) of the client mobile device along with the UID to the cryptography key management system by the key management application module; and on successful validation, associating the H(UDID) with the user account in a secure key database.

5. The method of claim 4, wherein sending the password encrypted H(UDID) of the client mobile device along with the UID to the cryptography key management system by the key management application module comprises:

obtaining the UDID from the client mobile device;

forming the hash of the UDID by using a hash algorithm;

sending the password encrypted H(UDID) along with the UID to the cryptography key management system over a secure communication channel;

authenticating the H(UDID) sent by the key management application module;

if authentication fails, then terminating communication with the client mobile device; and if the authentication is successful, then allowing a desired operation requested by the intended user.

6. The method of claim 2, wherein registering the cryptography/data recovery key for the associated client mobile device with the enterprise using the cryptography/data recovery key, the UID, the H(UDID), and the KeyID further comprises:

requesting the UID, the cryptography/data recovery key, and the Pswd upon connecting the client mobile device by the key management application module from an intended user;

determining the UDID associated with the client mobile device by the key management application module;

hashing the UDID by the key management application module to create the H(UDID);

encrypting the H(UDID) along with the cryptography/data recovery key using a symmetric cryptography key derived from the Pswd;

sending the encrypted H(UDID) along with the UID and the cryptography/data recovery key to the cryptography key management system by the key management application module;

passing the UID and requesting the stored Pswd;

returning the Pswd associated with the UID upon validating the passed UID by the cryptography key management system;

decrypting the H(UDID) and the cryptography/data recovery key using the returned Pswd;

if decryption is unsuccessful, then stopping the registering of the data recovery key;

if decryption is successful, then establishing a mutual authentication;

generating a KeyID and passing the H(UDID), the data recovery key, and the KeyID.

7. The method of claim 6, wherein decrypting the H(UDID) and the cryptography/data recovery key using the returned Pswd upon successful validation of the UID by the key management system comprises:

determining whether the encrypted H(UDID) and the cryptography/data recovery key can be decrypted using a symmetric cryptography key derived from the returned Pswd; and in response to a determination that the encrypted H(UID) and the cryptography/data recovery key can be decrypted, decrypting H(UDID) and the cryptography/data recovery key using a symmetric cryptography key derived from the returned Pswd.

8. A method comprising changing a user password (Pswd) in a cryptography key management system via a client mobile device using a unique user identifier (UID), a unique device identifier (UDID), a unique key identifier, a current password (Pswd), and a new password (NewPswd), the method further comprising:

requesting the UID, the Pswd and the NewPswd from an intended user via the client mobile device;

determining the UDID associated with the client mobile device;

hashing the UDID (H(UDID)) by a key management application module included on the client mobile device;

encrypting the hashed UDID and the NewPswd using a symmetric cryptography key derived from the Pswd to obtain a password-encrypted H(UDID) and an encrypted NewPswd;

sending the password-encrypted H(UDID) and the encrypted NewPswd to the cryptography key management system by the key management application module and requesting a change in the Pswd;

connecting the key management application module to a secure key database via a valid user role by the cryptography key management system upon a successful validation of the UID and returning the Pswd for the UID to the cryptography key management system by the secure key database;
decrypting the password-encrypted H(UDID) and the encrypted NewPswd using a symmetric cryptography key derived from the Pswd to obtain the H(UDID) and the NewPswd by the cryptography key management system; and
determining whether the decryption of the password-encrypted H(UDID) and the encrypted NewPswd was successful, comprising:
  if decryption fails, then terminating communication with the client mobile device; and
  if the decryption is successful, then validating integrity of the decrypted H(UDID) by comparing the H(UDID) sent by the key management application module with an H(UDID) already stored in the cryptography key management system for the UID; and
registering a cryptography/data recovery key for the client mobile device using the cryptography/data recovery key, the UID, the H(UDID), and a unique key identifier (KeyID), comprising, upon validating that the H(UDID) exists for the UID:
  storing the data recovery key and the KeyID associated with the UDID,
  encrypting the KeyID using a symmetric cryptography key derived from the NewPswd to obtain a password-encrypted KeyID and sending the password-encrypted KeyID to the key management application module by the cryptography key management system, and
  decrypting the password-encrypted KeyID using a symmetric cryptography key derived from the NewPswd to obtain the KeyID and storing the obtained KeyID by the key management application module.

9. The method of claim 8 wherein changing the Pswd via the client mobile device using the UID, the UDID, the Pswd, and the NewPswd further comprises:
  establishing a client authentication by the cryptography key management system and storing the NewPswd associated with the UDID and UID in the secure key database upon a successful decryption.

10. An article comprising:
  a non-transitory computer readable storage medium having instructions that, when executed by a processor cause the processor to:
  bind encryption and decryption keys using a unique user identifier (UID), a unique device identifier (UDID), and a user password (Pswd) to a client mobile device in an enterprise cryptography key management system, wherein to bind the encryption and decryption keys, the instructions are to cause the processor to:
    request the UDID from the client mobile device by the cryptography key management system;
    send a hashed unique device identifier H(UDID) encrypted by the Pswd along with the UID to the cryptography key management system by a key management application module included on the client mobile device;
    associate the H(UDID) with the user account, comprising:
      decrypting the encrypted H(UDID) by the cryptography key management system using the Pswd;
      if decryption fails, then terminating communication with the client mobile device; and
      if the decryption is successful, then validating integrity of the decrypted H(UDID) by comparing the H(UDID) sent by the key management application module with other H(UDID)s in the cryptography key management system to ensure that the H(UDID) is unique for the client mobile device; and
    register a cryptography/data recovery key for the associated client mobile device with the enterprise using the cryptography/data recovery key, the UID, the H(UDID), and a unique key identifier (KeyID),
    wherein to register the cryptography/data recovery key for the associated client mobile device, the instructions are to cause the processor to, upon validating that the H(UDID) exists for the UID:
      store the data recovery key and the KeyID associated with the UDID,
      encrypt the KeyID using a symmetric cryptography key derived from the Pswd to obtain a password-encrypted KeyID and send the password-encrypted KeyID to the key management application module, and
      decrypt the password-encrypted KeyID using a symmetric cryptography key derived from the password to obtain the KeyID and store the obtained KeyID by the key management application module.

11. The article of claim 10, wherein to bind the encryption and decryption keys using the UID, the UDID, and the Pswd, the instructions are further to cause the processor to:
  create a new user account using the UID and a default password (DPswd) in an inactive state in the cryptography key management system by an administrator;
  communicate the UID and the DPswd to an intended user using a secure communication medium by the administrator;
  log into the cryptography key management system using the UID and the DPswd via the client mobile device by the intended user upon authenticating the default password by the cryptography key management system;
  change the DPswd to a new password (NewPswd) by the intended user;
  send the NewPswd, encrypted by a cryptography key derived from the DPswd to the cryptography key management system; and
  replace the DPswd with the NewPswd if the NewPswd satisfies enterprise password security requirements.

12. The article of claim 11, wherein the cryptography/data recovery key is selected from a group consisting of a symmetric cryptography key and an asymmetric cryptography key.

13. The article of claim 11, wherein to send the H(UDID) obtained using the UDID associated with the client mobile device to the cryptography key management system by a key management application module and associating the H(UDID) with the user account, the instructions are to cause the processor to:
  hash the UDID of the client mobile device to create the H(UDID);
  encrypt the H(UDID) using the Pswd;
  send the password encrypted H(UDID) of the client mobile device along with the UID to the cryptography key management system by the key management application module; and
  on successful validation associating the H(UDID) with the user account in the secure key database.

14. The article of claim 13, wherein to send the password encrypted H(UDID) of the client mobile device along with the UID to the cryptography key management system by the key management application module, the instructions are to cause the processor to:
   obtain the UDID from the client mobile device;
   form the H(UDID) from the UDID by using a hash algorithm;
   send the password encrypted H(UDID) along with the UID to the cryptography key management system over a secure communication channel;
   authenticate the H(UDID) sent by the key management application module;
   if authentication fails, then terminate communication with the client mobile device; and
   if the authentication is successful, then allow a desired operation requested by the intended user.

15. The article of claim 11, wherein to register the cryptography/data recovery key for the associated client mobile device with the enterprise using the cryptography/data recovery key, the UID, the H(UDID), and the KeyID, the instructions are further to cause the processor to:
   request the UID, the cryptography/data recovery key, and the Pswd upon connecting the client mobile device by the key management application module from an intended user;
   determine a UDID associated with the client mobile device by the key management application module;
   hash the UDID by the key management application module to create the H(UDID);
   encrypt the H(UDID) along with the cryptography/data recovery key using a symmetric cryptography key derived from the Pswd;
   send the encrypted H(UDID) along with the UID and the cryptography/data recovery key to the cryptography key management system by the key management application module;
   pass the UID and request the stored Pswd;
   return the Pswd associated with the UID upon validating the passed UID by the cryptography key management system;
   decrypt the encrypted H(UDID) and the cryptography/data recovery key using the returned Pswd;
   if decryption is unsuccessful, then stop the registering of the data recovery key;
   if decryption is successful, then establish a mutual authentication; and
   generate a KeyID and pass the H(UDID), the data recovery key, and the KeyID.

16. The article of claim 15, wherein to decrypt the encrypted H(UDID) and the cryptography/data recovery key using the returned Pswd upon successful validation of the UID by the key management system, the instructions are to cause the processor to:
   determine whether the encrypted H(UDID) and the cryptography/data recovery key can be decrypted using a symmetric cryptography key derived from the returned Pswd; and
   in response to a determination that the encrypted H(UDID) and the cryptography/data recovery key can be decrypted, decrypt H(UDID) and the cryptography/data recovery key using a symmetric cryptography key derived from the returned Pswd.

17. A cryptography key management apparatus, comprising:
   a cryptography key management system that allows a user to create a new user account with the system and register with the system, allows the registered user to register a new client mobile device with the system, allows the registered user to register a cryptography/data recovery key with the system and associate/bind it with the client mobile device in the system, allows the registered user to request a cryptography key for encryption for the client mobile device from the system, allows the registered user to request a registered cryptography/data recovery key for decryption for the client mobile device from the system, allows the registered user to change its password/authentication tokens in the system, allows the registered user to decrypt the data stored encrypted on a removable media if the mobile device on which the encryption performed is lost or unavailable and allows an administrator to create and manage user accounts in the key management system;
   a secure key database coupled to the cryptography key management system to store the registered user account information, the registered cryptography/data recovery key information and information binding the cryptography/data recovery key with the registered client mobile device and the registered user, wherein the user account information comprises a unique user identifier (UID), a unique device identifier (UDID) of the registered client mobile device, password (Pswd)/authentication tokens stored in encrypted format and the account state,
   wherein to bind encryption and decryption keys using the UID, the UDID, and the Pswd to the client mobile device, the cryptography key management system is to:
   request the UDID from the client mobile device;
   receive a hashed unique device identifier H(UDID) encrypted by the Pswd along with the UID from a key management application module included on the client mobile device; and
   associate the H(UDID) with the user account, comprising:
      decrypt the encrypted H(UDID) by the cryptography key management system using the Pswd;
      if decryption fails, terminate communication with the client mobile device; and
      if the decryption is successful, validate integrity of the decrypted H(UDID) by comparing the H(UDID) sent by the key management application module with other H(UDID)s in the cryptography key management system to ensure that the H(UDID) is unique for the client mobile device; and
   wherein to register the cryptography/data recovery key for the client mobile device, upon validating that the H(UDID) exists for the UID, the cryptography key management system is to:
   store the data recovery key and a unique key identifier (KeyID) associated with the UDID,
   encrypt the KeyID using a symmetric cryptography key derived from the Pswd to obtain a password-encrypted KeyID and send the password-encrypted KeyID to the key management application module, and
   decrypt the password-encrypted KeyID using a symmetric cryptography key derived from the password to obtain the KeyID and store the obtained KeyID by the key management application module.

18. The apparatus of claim 17, wherein the cryptography key management system creates a new user account using the UID and a default password (DPswd) in an inactive state, wherein the UID and the DPswd is communicated to the intended user using a secure communication medium, wherein the intended user logs into the cryptography key management system using the UID and the DPswd via the client mobile device upon authenticating the DPswd by the cryptography key management system, wherein the user changes the DPswd to a new password (NewPswd), wherein the NewPswd is encrypted by a cryptography key derived from the DPswd and sent to the cryptography key management system, and wherein the DPswd is replaced with the NewPswd if the NewPswd satisfies enterprise requirements associated with a password strength stored in the secure key database.

19. The apparatus of claim 17, wherein the cryptography key management system authenticates the H(UDID), wherein the cryptography key management system terminates the communication with the client mobile device if the authentication fails, and wherein the cryptography key management system allows a desired operation by the intended user if the authentication is successful.

* * * * *